US012803817B2

(12) United States Patent
Menard et al.

(10) Patent No.: US 12,803,817 B2
(45) Date of Patent: Nov. 17, 2026

(54) VERIFIABLE ELECTRONIC CREDENTIAL FOR A PERSON USING A PUBLIC SIGNING KEY

(71) Applicant: AMADEUS S.A.S., Biot (FR)

(72) Inventors: Antoine Menard, Mougins (FR); David Trastour, Roquefort-les-Pins (FR); Jean Claude Irakiza, Antibes (FR); Alice Boissonnat, Antibes (FR); Eric Leroux, Cagnes sur Mer (FR)

(73) Assignee: AMADEUS S.A.S., Biot (FR)

( * ) Notice: Subject to any disclaimer, the term of this patent is extended or adjusted under 35 U.S.C. 154(b) by 101 days.

(21) Appl. No.: 19/014,041

(22) Filed: Jan. 8, 2025

(65) Prior Publication Data

US 2025/0240174 A1 Jul. 24, 2025

(30) Foreign Application Priority Data

Jan. 19, 2024 (EP) .................................... 24305121

(51) Int. Cl.
*H04L 9/32* (2006.01)
*G06F 21/62* (2013.01)
*H04L 9/08* (2006.01)

(52) U.S. Cl.
CPC ........ *H04L 9/3247* (2013.01); *G06F 21/6245* (2013.01); *H04L 9/0825* (2013.01); *G06F 2221/2141* (2013.01)

(58) Field of Classification Search
CPC ...... G06F 21/36; G06F 21/6245; G06F 21/64; G06F 2221/2141; H04L 63/0442;
(Continued)

(56) References Cited

U.S. PATENT DOCUMENTS

2020/0127826 A1* 4/2020 Ebrahimi ................ G06F 21/32
2020/0195436 A1 6/2020 Khan
(Continued)

FOREIGN PATENT DOCUMENTS

DE 102021107512 A1 9/2022
EP 3883204 A1 9/2021

*Primary Examiner* — Theodore C Parsons
(74) *Attorney, Agent, or Firm* — PERRY + CURRIER INC.

(57) ABSTRACT

A method is described for managing data of a user, the method comprising performing an issuing process and performing a verification process. The issuing process includes sending an image of a document issued by a first entity to a second entity that is included in a group of trusted entities, the document comprising data of a user, and validating, by the second entity, the user data using the image. A verifiable credential is generated based on the user data and receiving at a user device. A signed verifiable credential is created at the user device using the received verifiable credential. A public key corresponding to the verifiable credential is pushed to a data store that is accessible by the group of trusted entities, and the signed verifiable credential is encrypted and stored at the user device. The verification process includes receiving a request to access the user data from a third entity that is included in the group of trusted entities. The encrypted and signed verifiable credential stored at the user device is decrypted and sent to the third entity. The public key is accessed from the data store and used to verify that the signed verifiable credential was created at the user device.

16 Claims, 4 Drawing Sheets

(58) Field of Classification Search
CPC ............. H04L 63/0823; H04L 63/0869; H04L 63/102; H04L 63/126; H04L 9/0825; H04L 9/3247
See application file for complete search history.

(56) References Cited

U.S. PATENT DOCUMENTS

| | | | | |
|---|---|---|---|---|
| 2021/0409397 | A1* | 12/2021 | Bhatt | H04L 63/0884 |
| 2022/0011999 | A1* | 1/2022 | Lovelock | G06F 21/6245 |
| 2022/0200810 | A1* | 6/2022 | Barrett | H04L 63/0823 |
| 2024/0187259 | A1 | 6/2024 | Bergmann | |

* cited by examiner

VERIFIABLE ELECTRONIC CREDENTIAL FOR A PERSON USING A PUBLIC SIGNING KEY

CROSS-REFERENCE TO RELATED APPLICATION

This application claims priority from European Application No. 24305121.6, filed Jan. 19, 2024, which is also incorporated herein by reference in its entirety.

FIELD OF THE INVENTION

The present application relates to management of user data. In particular, the application relates to methods for shared user data from a user device in a secure and efficient manner.

BACKGROUND OF THE INVENTION

Many systems and services require their users to share a wide range of user data (often personally-identifiable information) in a way that such data can be verified and authenticated. In particular, when travelling, travellers currently have to provide proof of their identity and other data at multiple points along their journey, including at airline check-in, car hire, hotel check-in and travel agencies. Besides being time-consuming, having to present official documents such as passports, driving licenses, bank cards, visas each time proof of identity is required presents a security risk to personally-identifiable information and allows for unnecessary leakage of personal data. This also requires each entity requiring the identity data to validate the provided physical documents and information themselves, further reducing the efficiency of sharing personal or user data.

Although some attempts have been made to improve how users can share their data digitally, these still rely on a centralised approach that requires requesting parties to verify details with another entity. These also do not provide sufficient security against unauthorised access to personal data while maintaining the capability to reliably share that data in an efficient and interoperable manner.

SUMMARY OF THE INVENTION

The invention is defined in the independent claims and preferred features are set out in the dependent claims.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE FIGURES

Methods and systems for managing data of a user are described by way of example only, in relation to the Figures, wherein.

DETAILED DESCRIPTION

Figure 1:
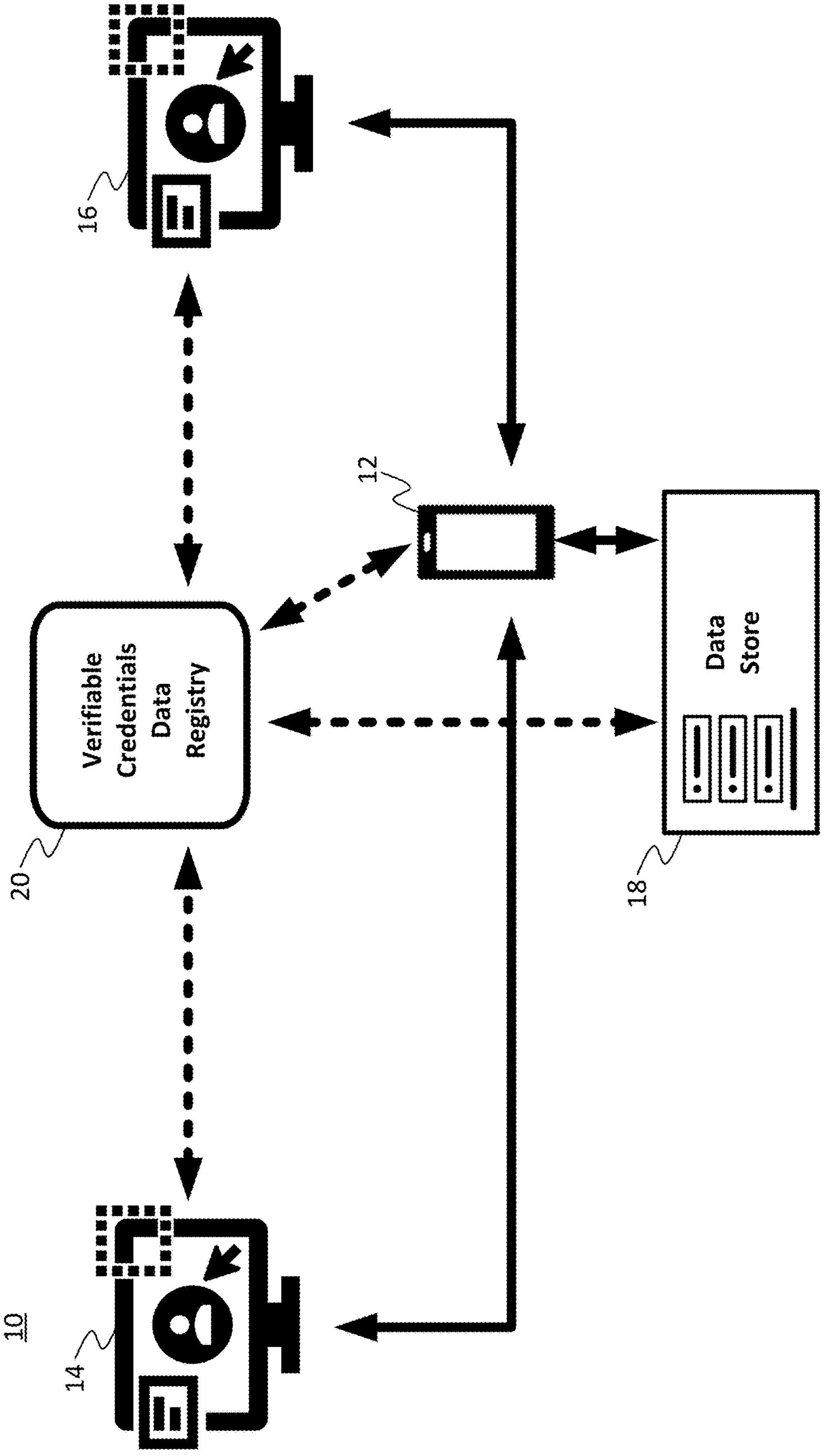
FIG. 1 shows a schematic diagram of a system for managing data of a user.

Referring to FIG. 1, a system 10 for managing data of a user will now be described. The system 10 may be used to manage user data that is derivable from a document issued by a first entity. For example, the user data may be derivable from (an image of) a passport issued by a passport office, a driving license issued by a driving license authority, a credit card issued by a bank, a government-issued visa, health record documents, or other such officially issued documents. User data may include personally identifiable information (PII) or identity data specific to the user.

The system includes a user device 12, a network element 14 associated with a second entity, a network element 16 associated with a third entity, and a data store 18. The network element 14 may be associated with an entity such as an airline, a train, bus or ferry operator, or other travel entity. The network element 16 may be associated with an entity such as a hotel, travel agency, car rental company, or other retail or hospitality entity.

In some examples, the network elements 14, 16 may include elements in hardware or software for interfacing with the associated entities, for example applications or web sites hosted by (a web server of) the associated entity running on a web browser of a device. Each network element may include multiple devices and/or software modules associated with the relevant entity. For the purposes of the methods described herein, the terms "second entity" and "third entity" may refer to the one or more network elements 14, 16 associated with those entities.

The network elements 14, 16 are configured to communicate with the user device 12 at least temporarily. The user device 12 may include a smartphone, laptop or other personal computing device associated with a user. In some examples, the user device 12 includes a camera.

The data store 18 (also referred to as a trust system) may include a public web server and/or a distributed ledger such as a blockchain. The user device 12 may use the data store 18 to store cryptographic keys (e.g. public keys), and the network elements 14, 16 are included in a group or network of trusted entities that have permission to access the data store 18.

As explained in more detail below, the system 10 enables a trusted digital identity to be created from existing documents and stored in a decentralized and trusted manner. This can enable the user to provide relevant data to different entities (e.g. travel actors) at different points of a journey in an efficient manner, by allowing for interoperability of digitalised documents (e.g. travel documents) using a single trusted digitalised source of data.

In some examples, the system 10 also includes a verifiable credentials data registry 20 which is configured to communicate with the second entity/network element 14 and the third entity/network element 16. As explained in more detail below, the registry 20 is configured to generate verifiable credentials upon request by the second entity/network element 14, and is also configured to act as a proxy for communications between the third entity/network element 16 and the user device. The registry 20 also has permission to access the data store 18.

Figure 2A:
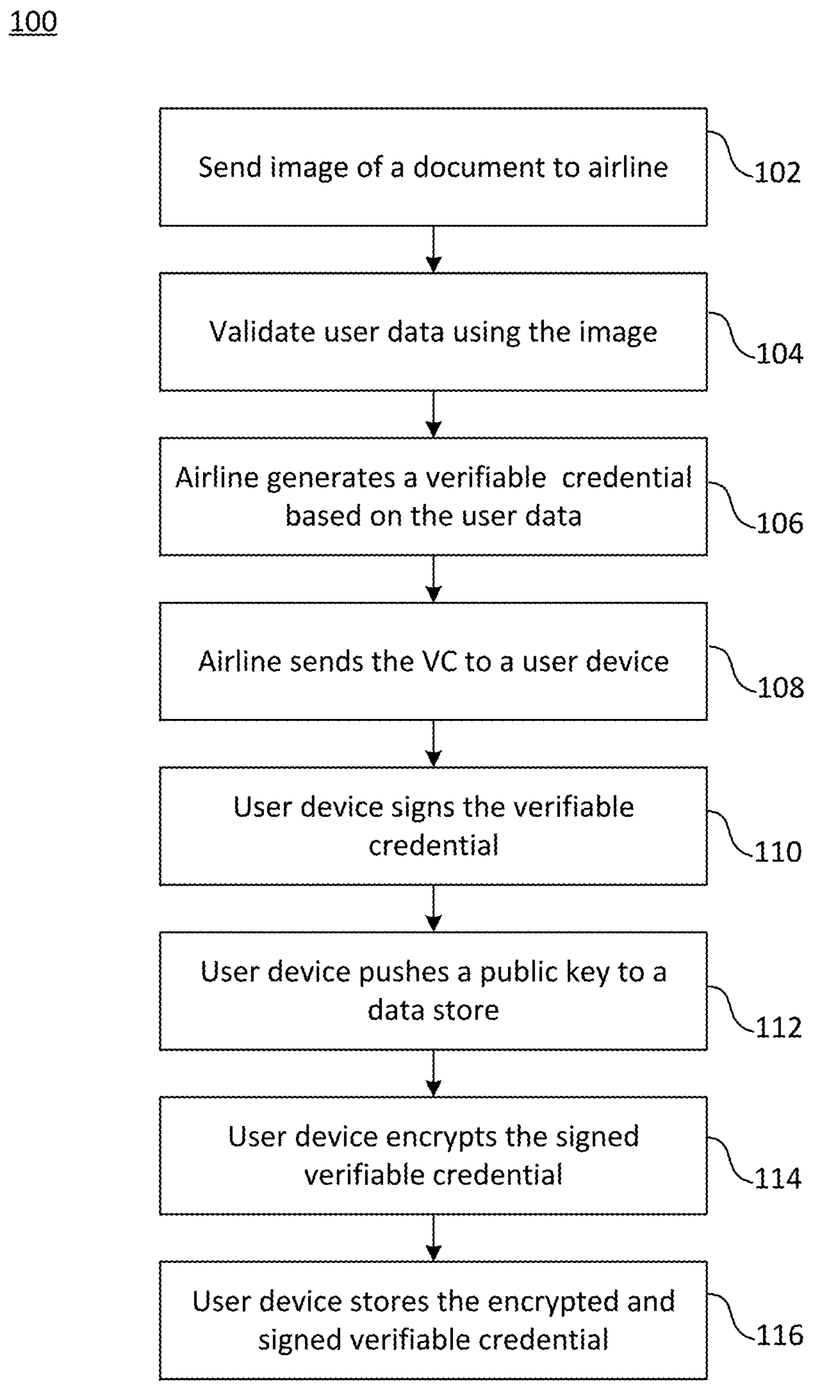
FIGS. 2*a*-2*d* illustrate (a) an issuing process for issuing a verifiable credential, (b) a verification process for verifying a verifiable credential, (c) a process for a user to provide storage permission, and (d) a process for a user to provide access permission.
Figure 2B:
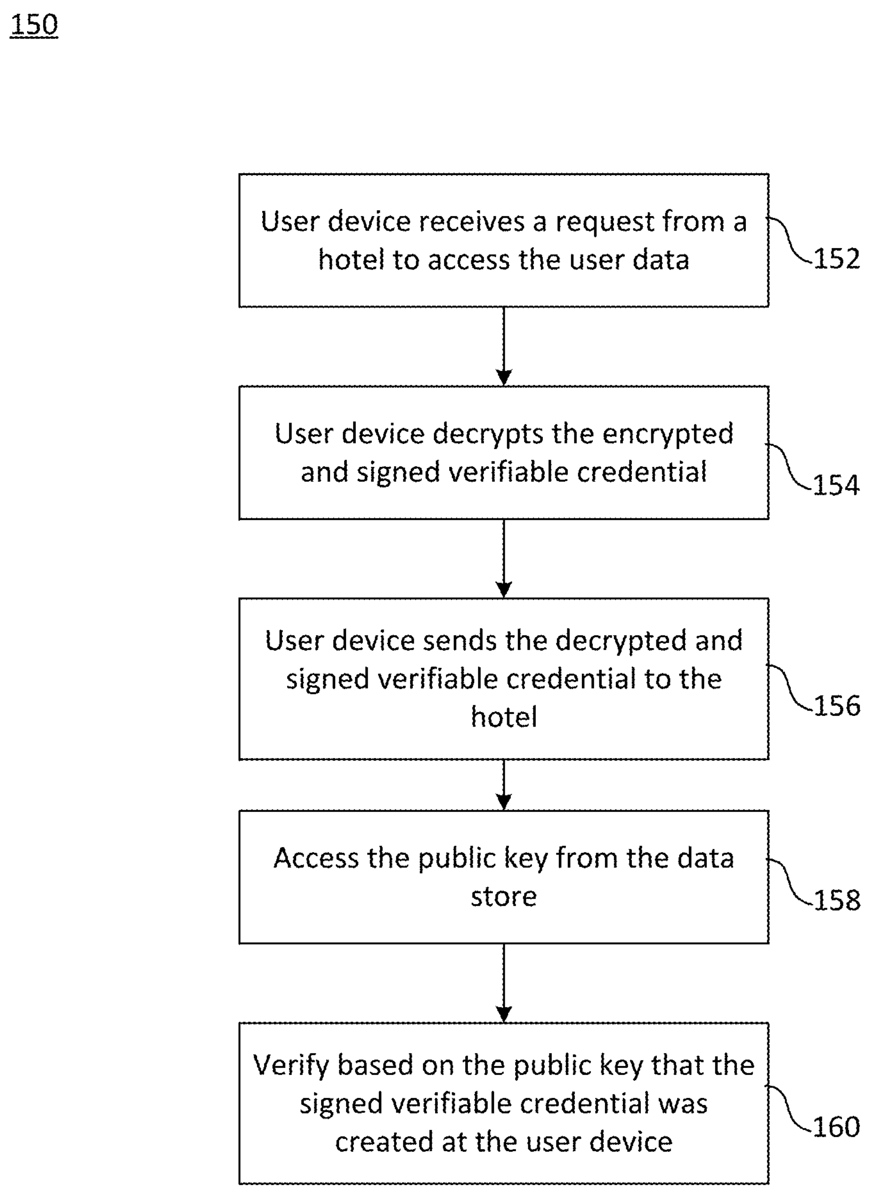

Referring to FIGS. 2*a*-2*b*, methods for managing data of a user will now be described. In particular, FIG. 2*a* illustrates an issuing or validation process 100 that is performed between a user and an issuer (such as an airline), for example between the user device 12 and network element 14 of the system of FIG. 1. FIG. 2*b* illustrates a verification or access process 150 that is performed between the user and a verifier (such as a hotel), for example between the user device 12 and network element 16 of the system FIG. 1.

Advantageously, by performing a method comprising the issuing process 100 and the verification process 150, a mechanism can be provided for user data to be shared in a trustworthy and secure manner, while also providing a user with a more flexible and efficient way of sharing their data. In particular, as explained in more detail below, by storing a verifiable credential that has been approved/validated (or "stamped") by an issuing entity on the user device, a user can provide their data (e.g. PII) to different actors or entities without needing to provide original documents since the other actors/entities can determine, based on the properties of the verifiable credential imparted by the issuing and verification processes, that the user data is trustworthy and genuine without needing to contact other entities (such as an issuing entity).

In one specific example, the issuing process described herein may be used to allow a user to save a digital version of data from their passport to a virtual wallet on their smartphone (such as the Microsoft Authenticator™ app) at the point of online check-in on an airline's website. Similarly, the verification process described herein may be used to allow passport information to be retrieved by any other trusted entity during a check-in process with that other entity (such as a hotel, car hire company, or another airline).

Issuing Process

The issuing process of FIG. 2*a* begins at step 102 by sending an image of a document (that has been issued by a first entity), or data extracted from an image of the document, to a second entity, wherein the document includes data of a user. The second entity is included in a group of trusted entities in a network or system. The user data may be extracted from the image by the user device (e.g. using native image analysis software) or at the second entity. Extracting the user data at the user device can avoid the need to send images to the second entity and can reduce leakage of unnecessary personal data. Alternatively, extracting the user data at the second entity can reduce the processing workload at the user device.

Upon receiving the image (or image-derived data), the second entity validates the user data using the image (or image-derived data) at step 104. For example, the user may provide an image of their passport to the second entity (such as an airline), which then extracts user data (e.g. identity data) from the image such as a name, date of birth, place of birth, passport number and/or nationality. Validating the user data may include sending the user data to a first entity (that issued the document from which the user data is derived) and receiving a response from the first entity indicative that the user data is valid. However, this may not be necessary and in some examples the second entity may be configured to validate the user data itself (e.g. based on a database of user data maintained by the second entity).

At step 106, the second entity then generates, based on the validated user data, a verifiable credential that includes an identifier of the second entity. In some examples, the second entity (e.g. airline) also signs the verifiable credential, e.g. by creating a digital signature for the verifiable credential using a cryptographic mechanism such as a public key infrastructure (PKI). Since the second entity is included in the group of trusted entities, the identifier and/or signature of the second entity included in the generated verifiable credential can enable other trusted entities to trust that the verifiable credential and the underlying user data are valid—this can avoid the need for other trusted entities to separately validate or check the authenticity of the user data.

The terms "signing" or "digitally signing" a verifiable credential, or creating a "signed verifiable credential", refer to the creation of a digital signature using a verifiable credential. A signed verifiable credential can include both the original (unsigned) verifiable credential and the (digital) signature, and as such the signature (output of the signing process) may be attached to its corresponding verifiable credential. In some examples, digital signatures are created using cryptographic mechanisms such as PKI approaches. For example, a signature may be a hashed/encrypted version of the verifiable credential that was created based on a private key belonging to the signing entity.

The generated verifiable credential is then received at a user device (such as user device 12) from the second entity (step 108). Optionally, the user device may verify that the second entity/airline is included in the group of trusted entities, for example based on the identifier and/or signature of the second entity included in the verifiable credential.

At step 110, the user device then creates a signed verifiable credential using the received verifiable credential—in other words, the user device signs or creates a digital signature for the received verifiable credential that the second entity generated. The creation of the signed verifiable credential may be based on a cryptographic private key belonging to the user device.

At step 112, the user device pushes a public key corresponding to the verifiable credential (for the user data derived from the image of the document) to a data store that is accessible by the group of trusted entities, such as the data store 18 of FIG. 1. The public key enables other entities (e.g. the third entity such as a hotel) to verify the signed verifiable credential, in particular to verify that the signed verifiable credential was created/signed by the user device—for example, the public key may correspond to a private key that the user device used to generate the signature, the two keys forming a cryptographic public-private key pair. As explained above, the data store may be implemented using a public web server and/or a distributed ledger such as a blockchain. This can enable a traceable chain of ownership/access to the public key, improving the security and control that a user has over their data.

The signed verifiable credential is then encrypted at the user device at step 114. For example, this encryption may be performed using encryption software (e.g. an authenticator app) running on the user device, such as the Microsoft® Authenticator app.

The user device then stores the encrypted and signed verifiable credential at step 116. For example, the user device may store the encrypted and signed verifiable credential using a virtual or digital wallet application running on the user device, for example such as an Apple Wallet™, Google Wallet™ or Microsoft Authenticator™ app. In some examples, the issuing process includes verifying (e.g. at the user device) that the second entity is included in the group of trusted entities, for example based on the identifier of the second entity included in the verifiable credential. Accordingly, one or more of signing the verifiable credential, pushing the public key to the data store, encrypting the signed verifiable credential and/or storing the encrypted and signed verifiable credential may be performed based on this verification.

This issuing process thus enables user data belonging to a user to be validated by a trusted entity and stored on the user's device, thus providing a decentralized data management approach. This can make sharing user data more efficient while also improving security and providing the user with greater agency over their personal data. For example, the signed verifiable credential is encrypted for storage on the user device, making it harder for unauthorised parties to access the user data.

Verification Process

The verification process 150 of FIG. 2*b* enables user data to be shared using verifiable credentials held on a user device, such as but not limited to those generated and stored using the issuing process 100 of FIG. 2*a*.

The verification process 150 begins at step 152 with the user device receiving a request from a third entity (such as a hotel, a different airline, a car rental company etc.) to access the user data. The third entity is also included in the group of trusted entities (although the user device may not have existing knowledge of this before receiving the request). The data access request originates from the third entity, so in some examples the request may be received at the user device directly from the third entity (or an interface associated with the third entity, such as a website). In other examples, the data access request may be received from the third entity via an intermediate entity, such as a data registry or other proxy.

At step 154, in response to receiving the request, the encrypted and signed verifiable credential that is stored at the user device is decrypted at the user device. This decrypted (and signed) verifiable credential is then sent to the third entity from the user device at step 156. The decrypted and signed verifiable credential is sent from the user device intended in order to provide the third entity with the requested user data. Therefore, as with the receiving of the data access request, the decrypted and signed verifiable credential may be sent directly from the user device to the third entity (or an interface associate with the third entity, such as a website), or it may be sent to an intermediate entity (such as a data registry) which in turn sends the signed verifiable credential or just the user data to the third entity.

After sending the decrypted and signed verifiable credential from the user device, the public key corresponding to the verifiable credential is accessed from the data store at step 158. Step 160 then includes verifying, based on the public key (and the decrypted and signed verifiable credential) that the signed verifiable credential was created at the user device. For example, the signature in the signed verifiable credential may be decrypted using the public key (and compared to a hash value) to determine that it was created by the user device, in other words to determine that it is valid.

In some examples, the accessing and/or verifying steps 158, 160 may be performed by the third entity (e.g. upon receipt of the decrypted and signed verifiable credential directly from the user device), or by an intermediate entity (e.g. a verifiable credentials data registry) acting as a proxy between the user device and third entity.

In some examples, the verification process includes verifying that the third entity is included in the group of trusted entities, for example based on an identifier of the third entity included in the data access request. This verification may be performed by the user device itself, or by an intermediate entity such as a verifiable credentials data registry. For example, a data registry can verify that the third entity is a trusted entity, and based on this verification, send information to the user device indicative of the identity of the third entity. Accordingly, the steps of decrypting the encrypted and signed verifiable credential and/or sending the decrypted and signed verifiable credential may be performed in response to this verifying step.

In some examples, the verification process includes verifying, at the third entity (or a credentials data registry), based on the identifier of the second entity in the decrypted and signed verifiable credential, that the generated verifiable credential was generated by the second entity. This can allow the third entity to trace the verifiable credential that it receives back to the original issuing entity of that verifiable credential (e.g. the airline) independently of the second entity. This can improve the efficiency of managing user data, while maintaining a verifiable chain of authenticity.

Following step 160 (and optionally any other verification steps performed by the third entity), the third entity can use the received decrypted and signed verifiable credential to access the user data that it requested. As such, the verification process may further include extracting the user data from the decrypted and signed verifiable credential at the third entity, and verifying the user data itself. Optionally, this verification of the user data can be in response to verifying that the generated verifiable credential was generated by the second entity and/or that the signed verifiable credential was created at the user device. The steps 156-160 of the verification process 150 may be performed in any order, for example depending on whether a data registry is being used as a proxy between the user device and the third entity.

In some examples, after verifying the user data, the third entity may assign one of more permissions to the user device. This can allow the third entity (e.g. a hotel or car rental company) to trust the authenticity and validity of the user data and that the data belongs to the owner of the user device (i.e. the user), and thus provide permissions directly to the user device, rather than to a separate device owned/managed by the third entity. For example, the one or more permissions can include area access control, wireless network connection and/or near field communication (NFC). For instance, if the third entity is a hotel, they may assign "room key card" permissions to the user device (e.g. via a virtual key app installed on the user device), allowing the user to use their device as a key card for their hotel room. In other examples, the user device may be given permission to establish wireless connections, e.g. to a Wi-Fi® network or via NFC.

Verifiable Credentials Data Registry

The methods and processes described herein may be implemented using a verifiable credentials data registry (such as the registry 20 of FIG. 1) for managing the creation of and access to verifiable credentials by the trusted entities. The data registry can provide an extra layer of protection by ensuring that the verifiable credentials are only handled in the back-end between the user device and second/third entities, meaning they are not shown on the user device which creates further barriers to unauthorised access of the verifiable credentials/user data.

The second entity is registered in the credentials data registry as an issuer. As part of this registration, the second entity identifies one or more predetermined types of user data that it wishes to create verifiable credentials for. As such, the second entity is a registered issuer for verifiable credentials comprising these one or more of these types of user data. Similarly, the third entity is registered in the credentials data registry as a verifier. As part of this registration, the third entity identifies one or more predetermined issuers that it wishes to verify verifiable credentials from. As such, the third entity is a registered verifier for verifying verifiable credentials issued by one or more predetermined issuers comprising the second entity. For example, an airline may be an issuer registered in the credentials data registry for issuing verifiable credentials comprising name, date of birth, passport number, nationality and/or visa information. Similarly, a hotel or car rental company may be a verifier registered in the credentials data registry for verifying verifiable credentials issued by that airline.

Information about the registered issuers and verifiers is stored at the credentials data registry and, by virtue of being registered at the registry, these issuers and verifiers are inherently trusted. The verifiable credentials data registry can be configured to access the data store (to access public keys) on behalf of registered issuers, registered verifiers and/or the user device. For example, a user device or a registered verifier can obtain the public key of a registered issuer (e.g. for verifying a signature of the issuer) via the data registry. Similarly, a registered verifier can obtain the public key of a user device (e.g. for verifying a signature of the user device) via the data registry. Equally, the user device may push its public key(s) to the data store via the data registry. Additionally or alternatively, the credentials data registry can be used to create identifiers for registered issuers and/or registered verifiers to access the data store (e.g. a blockchain).

When using a verifiable credentials data registry, generating the verifiable credential at step 106 of the issuing process 100 can include sending, from the second entity, the user data to the credentials data registry, generating a verifiable credential at the credentials data registry based on the received user data, and sending the generated verifiable credential back to the second entity (e.g. to a web server hosting a website or application associated with the second entity, such as the airline's website interface being accessed by the user). The sending of the user data to the credentials data registry may optionally be in response to receiving a message from the user opting in for user device storage of verifiable credentials. Equally, when using a credentials data registry, the registry may sign the generated verifiable credential on behalf of the second entity (using information it holds for the second entity), so that the generated verifiable credential can be sent directly from the registry to the (airline) website.

In the examples using a credentials data registry, the verification process 150 may include: receiving at the credentials data registry the request from the third entity to access the user data, wherein the request includes an identifier of the third entity. In this case, the verification process also includes verifying at the credentials data registry that the third entity is a registered verifier based on the received identifier. In response to this verifying step, the request to access the user data is sent to the user device. In some examples, the credentials data registry generates (on behalf of the third entity) a presentation request that is based on the data access request from the third entity, and sends it to the user device. The presentation request specifies which data and/or which corresponding verifiable credential(s) is being requested by the third entity.

Additionally or alternatively, when using a credentials data registry, sending the decrypted and signed verifiable credential to the third entity at step 156 of the verification process 150 comprises: sending the decrypted and signed verifiable credential from the user device to the credentials data registry in response to receiving the request to access the data and accessing by the credentials data registry the public key (associated with the verifiable credential) from the data store. The credentials data registry then verifies based on the public key that the signed verifiable credential was created at the user device, and in response to this verifying step, the decrypted and signed verifiable credential is sent from the credentials data registry to the third entity. Using the credentials data registry as a proxy between the user device and the third entity in this manner can improve the verifier's implementation of the protocol since they receive the data/verifiable credentials from the same source (the registry) each time they require data from different users), and it can avoid circulating the requested user data on the front-end of the third entity/user device's applications where it can be more vulnerable to man-in-the-middle attacks.

User Permissions

Figure 2C:
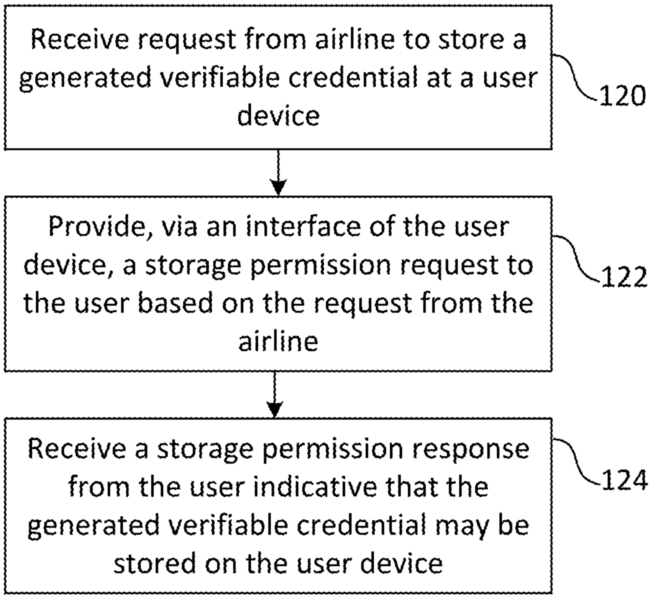

The methods and processes described herein may include further steps to provide users with greater control over their data. For example, as illustrated in FIG. 2*c*, the issuing process 100 may further include receiving a request from the second entity to store the generated verifiable credential at the user device at step 120. At step 122, a storage permission request may be provided to the user via an interface (e.g. touchscreen) of the user device based on the request from the second entity to store the generated verifiable credential. Then, at step 124, a storage permission response is received via the user device interface from the user, the response indicative that the generated verifiable credential may be stored on the user device. The storing of the encrypted and signed verifiable credential at step 116 is performed in response to receiving the storage permission response—the steps 110-114 may also be dependent on this storage permission response. Thus, the user can opt in for storage of verifiable credentials on their device before the device begins processing and storing the credential generated by the second entity.

Figure 2D:
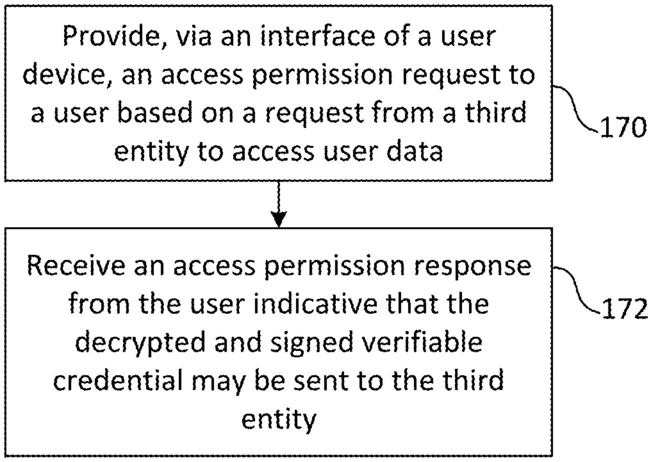

Similarly, as illustrated in FIG. 2*d*, the verification process 150 may further include at step 170 providing, via an interface of the user device, an access permission request to the user based on the request from the third entity to access the user data. Then, at step 172, an access permission response is received via the user device interface from the user, the response indicative that the decrypted and signed verifiable credential may be sent to the third entity. Accordingly, step 156 of the verification process 150 may be performed in response to receiving the access permission response.

For example, the storage permission request and/or the access permission request may be provided by a notification on a display of the user device. The storage permission response and/or the access permission response may be received by user input on a touchscreen (e.g. by selecting a button) of the user device.

If, however, the user does not opt in for or permit storage of verifiable credentials on the user device or access to a stored verifiable credential, this non-approval will be conveyed to the relevant second/third entity (optionally via a credentials data registry).

In examples where an application or website hosted by the second entity (for the user to communicate with the second entity) is being run or accessed on the user device, the request from the second entity to store the generated verifiable credential (step 120) may be received at the user device via the second entity's application/website. Similarly, where an application or website hosted by the third entity (for the user to communicate with the third entity) is being run or accessed on the user device, the request from the third entity to access the user data (step 152) may be received at the user device via the third entity's application/website. Accordingly, the user device may directly display these requests received via its locally running application/web browser as the storage and/or access permission requests of steps 122 and 170.

In other examples, the user may communicate with the second and/or third entity via a different device (from where the verifiable credentials are to be stored. For example, a user may access an airline's website on a desktop/laptop computer, whereas the device that they intend to store verifiable credentials on (and thus share their data from) may be a smartphone or other mobile user device. In such cases, provided the user device has a camera or other code-scanning means, receiving the request from the second entity to store the generated verifiable credential (at step 120) may include: displaying a scannable code (e.g. a quick-response, QR, code) on a second entity interface, and scanning the code by the camera of the user device. For example, the second entity interface may include a website hosted by the second entity being displayed via a web browser on a display of a desktop/laptop computer. Upon scanning the code by the user device, the user device may then provide the storage permission request to the user via its user interface (at step 122).

Similarly, receiving the request from the third entity to access the user data (at step 152) may include: displaying a scannable code (e.g. a QR code) on a third entity interface (e.g. a website of the third entity being run on a web browser), and scanning the code by the camera of the user device. Upon scanning the code by the user device, the user device may then provide the access permission request to the user via its user interface (at step 170).

This can ensure that permission requests are always displayed and responded to on the user device that is intended for storage of verifiable credentials, even if the user is communicating with the relevant entity via other channels such as a website.

Although the above methods and processes are described with reference to a single verifiable credential, an issuer may create multiple verifiable credentials based on the user data (derived from the image of a document) using the approaches described above. In such cases, at step 152 of the verification process 150, a request is received from the third entity to access at least a portion of a plurality of encrypted and signed verifiable credentials that are stored at the user device. In response to this request, the user device decrypts one or more of its encrypted and signed verifiable credentials that correspond to the requested portion of the user data. These are then sent and verified (based on accessed public keys) as per steps 156-160 described above. By creating multiple verifiable credentials based on a single image of a document, leakage of user data can be reduced. For example, by creating a separate verifiable credential for each piece of user data derived from the image (e.g., for first name, surname, date of birth, nationality, passport number etc.), only the data requested by the third entity is provided to them, the user having originally provided only a single document, yet the third entity can trust that each separate piece of information is valid and authentic without needing to see the original or whole of the official document.

While a specific system architecture is shown in FIG. 1, any appropriate hardware/software architecture may be employed. For example, the user device, second and third entities, data store and (optionally) credentials data registry may be configured to communicate with each other via a communications network (not shown).

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

The invention claimed is:

1. A method for managing data of a user, the method comprising:

(a) performing an issuing process comprising the steps of:
- sending an image of a document issued by a first entity to a second entity, wherein the document comprises data of a user, wherein the second entity is included in a group of trusted entities, wherein the second entity is registered in a credentials data registry as an issuer for issuing verifiable credentials that comprise one or more predetermined types of user data;
- validating, by the second entity, the user data using the image;
- generating a verifiable credential by the second entity based on the user data, the verifiable credential including an identifier of the second entity;
- receiving, at a user device, the generated verifiable credential from the second entity;
- creating, at the user device, a signed verifiable credential using the received verifiable credential;
- pushing, to a data store that is accessible by the group of trusted entities, a public key corresponding to the verifiable credential for verifying the signed verifiable credential;
- encrypting the signed verifiable credential at the user device; and
- storing the encrypted and signed verifiable credential at the user device; and (b) performing a verification process comprising the steps of:
- receiving, at the credentials data registry, a request from a third entity to access the user data, wherein the request comprises an identifier of the third entity, and wherein the third entity is included in the group of trusted entities, and wherein the third entity is registered in the credentials data registry as a verifier for verifying verifiable credentials issued by one or more predetermined issuers comprising the second entity:
- verifying, at the credentials data registry, that the third entity is a registered verifier based on the received identifier, and in response to the verifying, sending the request to access the user data to the user device;
- receiving, at the user device, the request to access the user data;
- decrypting, at the user device, the encrypted and signed verifiable credential stored at the user device;
- sending, from the user device to the third entity, the decrypted and signed verifiable credential;
- accessing the public key from the data store; and
- verifying, based on the public key, that the signed verifiable credential was created at the user device.

2. The method of claim 1, wherein the issuing process comprises verifying, at the user device, that the second entity is included in the group of trusted entities, and wherein storing the encrypted and signed verifiable credential at the user device is in response to verifying that the second entity is included in the group of trusted entities; and/or wherein the verification process comprises verifying that the third entity is included in the group of trusted entities, and wherein sending the decrypted and signed verifiable credential to the third entity is in response to verifying that the third entity is included in the group of trusted entities.

3. The method of claim 1, wherein the method further comprises extracting, at the user device or at the second entity, the user data from the image.

4. The method of claim 1, wherein generating the verifiable credential by the second entity further comprises:

sending, from the second entity, the user data to the credentials data registry, optionally in response to receiving a message from the user opting in for user device storage of verifiable credentials;

generating, at the credentials data registry, the verifiable credential based on the user data; and sending the generated verifiable credential to the second entity.

5. The method of claim 1, wherein sending the decrypted and signed verifiable credential to the third entity comprises:

sending the decrypted and signed verifiable credential from the user device to the credentials data registry in response to receiving the request to access the user data;

accessing, by the credentials data registry, the public key from the data store;

verifying, at the credentials data registry and based on the public key, that the signed verifiable credential was created at the user device; and in response to the verifying, sending the decrypted and signed verifiable credential from the credentials data registry to the third entity.

6. The method of claim 1, wherein the issuing process further comprises:

receiving a request from the second entity to store the generated verifiable credential at the user device, providing, via an interface of the user device, a storage permission request to the user based on the request from the second entity to store the generated verifiable credential, and receiving via the user device interface a storage permission response from the user indicative that the generated verifiable credential may be stored on the user device, wherein the encrypted and signed verifiable credential is stored at the user device in response to receiving the storage permission response; and/or wherein the verification process further comprises:

providing, via an interface of the user device, an access permission request to the user based on the request from the third entity to access the user data, and receiving via the user device interface an access permission response from the user indicative that the decrypted and signed verifiable credential may be sent to the third entity, wherein the decrypted and signed verifiable credential is sent from the user device in response to receiving the access permission response.

7. The method of claim 6, wherein the request from the second entity to store the generated verifiable credential is received at the user device via an application or website associated with the second entity and accessed at the user device; and/or wherein the request from the third entity to access the user data is received at the user device via an application or website associated with the third entity and accessed at on the user device.

8. The method of claim 6, wherein the user device comprises a camera, and wherein:

receiving the request from the second entity to store the generated verifiable credential at the user device comprises: displaying a scannable code, optionally a quick-response, QR, code, on a second entity interface, and scanning the code by the camera; and/or receiving the request at the user device from the third entity to access the user data comprises: displaying a scannable code, optionally a QR code, on a third entity interface, and scanning the code by the camera.

9. The method of claim 1, wherein the verification process further comprises verifying, at the third entity, that the generated verifiable credential was generated by the second entity based on the identifier of the second entity in the decrypted and signed verifiable credential.

10. The method of claim 1, wherein the verification process further comprises extracting the user data from the decrypted and signed verifiable credential at the third entity and verifying the user data, optionally in response to verifying that the generated verifiable credential was generated by the second entity and/or in response to verifying that the signed verifiable credential was created at the user device.

11. The method of claim 10, further comprising the step of, in response to verifying the user data, assigning one or more permissions to the user device, optionally wherein one or more permissions enable one or more of: area access control, wireless network connection and/or near field communication.

12. The method of claim 1, wherein the issuing process comprises:

generating a plurality of verifiable credentials by the second entity based on the user data;

receiving the plurality of generated verifiable credentials at the user device;

creating, at the user device, a plurality of signed verifiable credentials using the received verifiable credentials;

pushing to the data store a public key corresponding to each verifiable credential;

encrypting the signed verifiable credentials at the user device; and storing the encrypted and signed verifiable credentials at the user device; and wherein the verification process comprises:

receiving, at the credentials data registry, a request from the third entity to access at least a portion of the user data;

decrypting, at the user device, one or more of the encrypted and signed verifiable credentials stored at the user device that correspond to the requested portion of the user data;

sending, from the user device to the third entity, the decrypted and signed verifiable credentials;

accessing one or more of the public keys corresponding to the decrypted and signed verifiable credentials; and verifying, based on the one or more public keys, that the signed verifiable credentials sent from the user device were created at the user device.

13. The method of claim 1, wherein the data store comprises a public web server and/or a distributed ledger, optionally a blockchain.

14. The method of claim 1, wherein storing the encrypted and signed verifiable credential at the user device comprises storing the encrypted and signed verifiable credential via a virtual wallet application running on the user device.

15. A system for managing data of a user derivable from a document issued by a first entity, the system comprising:
- a data store;
- a user device;
- a network element associated with a second entity;
- a network element associated with a third entity; and
- a credentials data registry:
- wherein the user device and network elements each comprise one or more processors, the processors configured to perform the method of claim 1.

16. A non-transitory computer-readable medium comprising instructions which, when executed by a computer, cause the computer to carry out the method of claim 1.

* * * * *